US 6,608,608 B2

(12) United States Patent
Kanamori

(10) Patent No.: US 6,608,608 B2
(45) Date of Patent: Aug. 19, 2003

(54) VEHICULAR HEAD UP DISPLAY

(75) Inventor: Naohito Kanamori, Yokkaichi (JP)

(73) Assignee: Denso Corporation, Kariya (JP)

( * ) Notice: Subject to any disclaimer, the term of this patent is extended or adjusted under 35 U.S.C. 154(b) by 178 days.

(21) Appl. No.: 09/760,736

(22) Filed: Jan. 17, 2001

(65) Prior Publication Data

US 2001/0008394 A1 Jul. 19, 2001

(30) Foreign Application Priority Data

Jan. 17, 2000 (JP) .......................................... 2000-010351

(51) Int. Cl.[7] .............................................. G02F 1/1335
(52) U.S. Cl. ................................ 345/8; 345/7; 345/87; 307/10.1; 315/64; 349/11; 349/57; 359/630
(58) Field of Search ...................... 345/7, 8, 87; 315/64; 307/10.1; 349/11, 57; 359/636

(56) References Cited

U.S. PATENT DOCUMENTS

| 4,080,548 A | * | 3/1978 | Johnson ........................ 315/68 |
| 4,563,617 A | * | 1/1986 | Davidson .................... 313/513 |
| 4,587,457 A | * | 5/1986 | Lind ............................ 315/154 |
| 4,734,625 A | * | 3/1988 | Geanous et al. ............ 315/313 |
| 4,842,556 A | * | 6/1989 | Vogel .......................... 439/638 |
| 5,414,461 A | * | 5/1995 | Kishi et al. ..................... 345/7 |
| 5,572,342 A | | 11/1996 | Higuchi et al. |
| 6,100,943 A | * | 8/2000 | Koide et al. ..................... 345/7 |
| 6,159,236 A | * | 12/2000 | Biel ............................. 604/20 |
| 6,291,906 B1 | * | 9/2001 | Marcus et al. .............. 180/169 |
| 6,407,783 B1 | * | 6/2002 | Ohgawara et al. .......... 349/110 |
| 6,412,973 B1 | * | 7/2002 | Bos . ........................... 362/494 |

FOREIGN PATENT DOCUMENTS

| JP | 6-23156 | 3/1994 |
| JP | 6-50238 | 7/1994 |

* cited by examiner

Primary Examiner—Bipin Shalwala
Assistant Examiner—Vincent E. Kovalick
(74) Attorney, Agent, or Firm—Harness, Dickey & Pierce PLC

(57) ABSTRACT

A light source of a liquid crystal panel employed in a head up display for a vehicle has an embedded filament for emitting a light with high luminance and another embedded filament for emitting a light with low luminance. The embedded filament for emitting a light with low luminance is used for a first luminance range. On the other hand, the embedded filament for emitting a light with high luminance is used for a second luminance range. In addition, both the elements may be used at the same time for emitting a light with maximum luminance of the first range and the second range.

2 Claims, 4 Drawing Sheets

VEHICULAR HEAD UP DISPLAY

CROSS-REFERENCE TO RELATED APPLICATION

The present invention is related to Japanese patent application No. Hei. 2000-10351, filed Jan. 17, 2000; the contents of which are incorporated herein by reference.

1. Field of the Invention

The present invention relates to a vehicular head up display, and more particularly, to a vehicular head up display that adjusts luminescence according to outside conditions.

2. Background of the Invention

A conventional vehicular head up display of this type is disclosed in documents such as JP-B2-2861809 (U.S. Pat. No. 5,572,342). Here, the head up display includes a liquid crystal panel provided on the back-surface side of an instrument panel in the vehicle compartment, and a light source provided on the back side of the liquid crystal panel. A reflecting mirror reflects a display light, which is based on a light generated by the light source and is emitted from the liquid crystal panel. The reflected display light propagates to a front wind shield by way of an upper wall opening bored through the instrument panel. The front wind shield forms a virtual image in front of the driver to display information generated by the liquid crystal panel, so that the driver can visually recognize the display information.

The head up display employs a xenon lamp or a halogen lamp generally having an embedded single filament as a light source. However, such a light source has a problem that, if the luminance of an emitted light is changed by varying an applied voltage, the color of the light also changes as well. In other words, the color of light emitted by the light source varies when the brightness of the light is changed.

In order to solve the problem, a detailed study was conducted. A result of the study indicates that, when the weather is good during day time, the head up display is generally required to emit a light with a highest degree of luminance in order to allow the driver to visually recognize the virtual image with a high degree of reliability. At night, excessively high luminance of light emitted by the light source reversely results in too bright virtual image, which adversely becomes a disturbance to the driving operation of the driver. Thus, in order to let the driver visually recognize the virtual image information well, it is necessary to generate a light with luminance thereof adjusted to at least about 1/100 of luminance ratio without a recognized change in emitted-light color.

In the case of a light source having an embedded single filament as described above, in order to prevent the driver from recognizing a change in emitted-light color, the luminance of the emitted light cannot be changed to a magnitude smaller than about 1/10 of luminance ratio.

A relation between the luminance of an emitted light and an applied voltage for a xenon lamp was studied. As a result of the study, a characteristic represented by a graph shown in FIG. 5 was obtained. In addition, a relation between X chrominance and Y chrominance on a Munsell color table to an applied voltage for a xenon lamp was also studied. As a result of the study, characteristics represented by graphs b and c shown in FIG. 6 were obtained. To be more specific, the graph b represents a relation between X chrominance and an applied voltage whereas the graph c represents a relation between Y chrominance and an applied voltage. It should be noted that, as a sample of the xenon lamp, a C-2V xenon lamp made by TOSHIBA LIGHTING & TECHNOLOGY CORPORATION was used in the study. As for the measurement apparatus, a BM-5A Chrominance Measurement Instrument made by Topcon Corporation was used.

As is obvious from the graph shown in FIG. 5, the luminance of light emitted by the xenon lamp at applied voltages in a range lower than about 6.8 V is very small. Expressed in terms of a luminance ratio to a predetermined reference, the value is equal to or smaller than 0.1. For applied voltages in a range higher than about 6.8 V, on the other hand, the luminance increases substantially with the increases in applied voltage. As is obvious from the graphs b and c shown in FIG. 6, the X chrominance of light emitted by the xenon lamp at applied voltages in a range lower than about 6.8 V is far separated from the Y chrominance. For applied voltages in a range higher than about 6.8 V, on the other hand, the X chrominance of light emitted by the xenon lamp is close to the Y chrominance.

Thus, in order to prevent the driver from recognizing a change in chrominance of light emitted by the xenon lamp, it is necessary to use the luminance of a light at applied voltages in a range higher than about 6.8 V. In this range, however, the luminance of the emitted light cannot be changed to a magnitude smaller than about 1/10 of luminance ratio as described above and as evidenced by the graph shown in FIG. 5.

Note that, as a light source of the head up display, it is also possible to use a light source having two embedded filaments as is disclosed in JP-U-6-23156, JP-U-6-50238. However, the problem of the luminance of the emitted light cannot be solved by merely using the two-filament light source.

SUMMARY OF THE INVENTION

It is thus an object of the present invention to provide a vehicular head up display that employs a plurality of embedded filaments with luminance levels different from each other as a light source of a liquid crystal display unit and allows luminance to be varied over a wide range while properly suppressing changes in color of light emitted by the light source.

According to a first aspect of the present invention, there is provided a vehicular head up display comprising a light source provided on the back-surface side of an instrument panel located below a front wind shield inside a vehicle; a liquid crystal display unit provided on the back-surface side of the instrument panel in front of the light source and used for emitting a light originated from the light source as a display light representing information; and an optical element for passing the display light emitted by the liquid crystal display unit by way of an opening bored through the instrument panel as an image-formation light on the front wind shield, wherein the front wind shield reflects the image-formation light generated by the optical element and displays the information as a virtual image.

The head up display further has a brightness-sensing means for sensing brightness outside the vehicle; a setting means for setting a light-control quantity for the light source at a value corresponding to the brightness outside the vehicle; and control means to 246, and for controlling luminance of light emitted by the light source in accordance with the brightness outside the vehicle and the set light-control quantity.

The light source has a plurality of embedded filaments and having luminance levels different from each other. The control means controls the luminance of light emitted by the light source by driving a filament with low luminance selected among the filaments. A filament is selected in such a way that, the smaller the set light-control quantity, the lower the luminance of the selected filament.

As described above, the head up display employs a light source having a plurality of embedded filaments and having luminance levels different from each other. In addition, the control means control the luminance of light emitted by the light source by driving a filament that has low luminance and is selected among the filaments in such a way that, the smaller the set light-control quantity, the lower the luminance of the selected filament. Thus, the control means controls the luminance of light emitted by the light source by assigning one of the filaments to cover a portion of a range of changes in luminance of the light emitted by the light source. As a result, it is possible to let the driver recognize display information of the liquid crystal panel as a virtual image while suppressing shifts in color of the light emitted by the light source $10b$ to a level unrecognizable by the driver.

In a vehicular head up display provided by another aspect of the invention, a liquid crystal display unit receiving a light from a light source represents information as a display light, forming an image on a reflecting member in front of the driver seat in the vehicle to be recognized by the driver.

This head up display comprises a brightness-sensing means for detecting brightness outside the vehicle; and control means for controlling luminance of light emitted by the light source in accordance with the brightness outside the vehicle.

The light source has a plurality of embedded filaments having luminance levels different from each other. The control means control the luminance of light emitted by the light source by driving a filament with low luminance selected among the filaments. A filament is selected in such a way that, the smaller the amount of brightness, the lower the luminance of the selected filament.

In this way, the control means control the luminance of light emitted by the light source by driving a filament that has low luminance and is selected among the filaments in such a way that, the smaller the amount of the brightness, the lower the luminance of the selected filament. By controlling the luminance of light emitted by the light source in this way, the same effect as the head up display according to the first aspect can be obtained.

In addition, a vehicular head up display provided according to a third aspect of the invention comprises a light source provided on the back-surface side of an instrument panel located below a front wind shield inside a vehicle; a color liquid crystal display unit provided on the back-surface side of the instrument panel in front of the light source and used for emitting a light from the light source as a display light representing information; and an optical element for passing the display light emitted by the color liquid crystal display unit by way of an opening bored through the instrument panel as an image-formation light on the front wind shield, wherein the front wind shield reflects the image-formation light generated by the optical element and displays the information as a virtual image.

The head up display further has a brightness-sensing means for sensing brightness outside the vehicle; a setting means for setting a light-control quantity for the light source at a value corresponding to the brightness outside the vehicle; and control means, for controlling luminance of light emitted by the light source in accordance with the brightness outside the vehicle and the light-control quantity.

The light source has a plurality of embedded filaments having luminance levels different from each other. In the case of a small set light-control quantity, the control means control the luminance of light emitted by the light source by driving a filament with low luminance selected among the filaments. In the case of a large set light-control quantity, on the other hand, the control means control the luminance of light emitted by the light source by driving at least a filament with high luminance selected among the filaments.

As described above, the light source $10b$ has a plurality of embedded filaments having luminance levels different from each other wherein, in the case of a small set light-control quantity, the control means control the luminance of light emitted by the light source by driving a filament with low luminance selected among the filaments while, in the case of a large set light-control quantity, the control means control the luminance of light emitted by the light source by driving at least a filament with high luminance selected among the filaments. As a result, the same effect as the head up display according to the first aspect can be obtained.

Further areas of applicability of the present invention will become apparent from the detailed description provided hereinafter. It should be understood that the detailed description and specific examples, while indicating preferred embodiments of the invention, are intended for purposes of illustration only, since various changes and modifications within the spirit and scope of the invention will become apparent to those skilled in the art from this detailed description. In the drawings:

BRIEF DESCRIPTION OF THE DRAWINGS

The present invention will become more fully understood from the detailed description and the accompanying drawings, wherein.

DETAILED DESCRIPTION OF THE INVENTION

Figure 1:
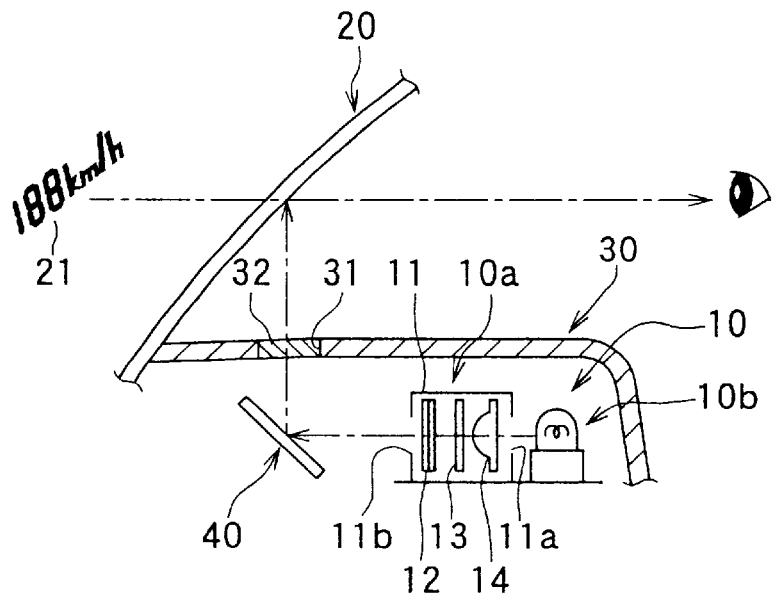
FIG. 1 is a cross-sectional view of a head up display for an automobile according to the present invention.

Referring now to FIG. 1, a diagram showing a typical application of the head up display provided by the present invention to an automobile is provided. As shown in the figure, the head up display has a display unit 10 provided on the back-surface side of an instrument panel 30 extended from the bottom edge of a front window shield 20 of the automobile toward the inside of the automobile and bent downward.

The display unit 10 comprises a unit main body $10a$ and a light source $10b$. The unit main body $10a$ comprises a transmission-type liquid crystal panel 12 accommodated in a casing 11, a filter 13 and a plane-convex lens 14. An incident visible light generated by the light source 10b reaches the plane-convex lens 14 by way of an opening 11a bored through the casing 11, being converted by the lens 14 into parallel beams is emitted from the lens 14 to the filter 13.

The filter 13 filters out heat rays from the visible light generated by the light source 10b before passing on the light to the liquid crystal panel 12. The liquid crystal panel 12 is a color liquid crystal panel. Driven by a driving circuit 50 as shown in FIG. 2, the liquid crystal panel 12 receives the visible light passing through the filter 13 as an incident light and emits a display light conveying information required by the automobile to a reflecting mirror 40 such as a concave mirror by way of another opening 11b bored through the casing 11.

The light source 10b is a halogen or xenon lamp. The light source 10b has 2 embedded filaments 15 and 16 shown in FIG. 2. Used for emitting light with low luminance, the filament 15 is constituted of a thin and short tungsten wire. Used for emitting light with high luminance, on the other hand, the filament 16 is constituted of a thick and long tungsten wire.

Figure 2:
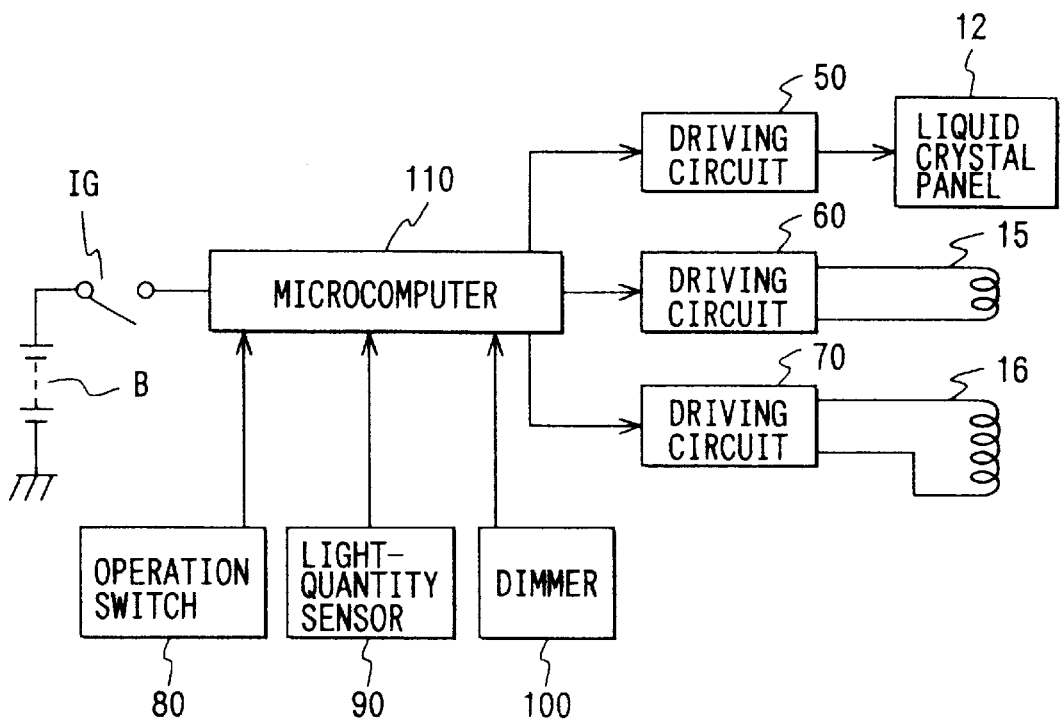
FIG. 2 is a block diagram showing a circuit configuration of the head up display according to the present invention.

The filament 15 or 16 employed in the light source 10b is driven by a driving circuit 60 or 70 respectively as shown in FIG. 2, emitting a light with luminance corresponding to a voltage applied thereto. That is, the light source 10b outputs light emitted by either the filament 15 or the filament 16 as a visible light to the filter 13.

The reflecting mirror 40 is positioned beneath a transparent dustproof cover 32 and in front of the opening 11b bored through the casing 11, being oriented in such a slanting posture that the reflecting mirror 40 faces both the transparent dustproof cover 32 and the opening 11b. The transparent dustproof cover 32 is engaged with an upper-wall opening 31 bored through the instrument panel 30. Thus, the reflecting mirror 40 reflects the display light conveying information and coming from the liquid crystal panel 12 by way of the opening 11b bored through the casing 11, directing the reflected light to the front wind shield 20 by way of the transparent dustproof cover 32 as an image-formation light. In other words, the reflecting mirror 40 causes the display light coming from the liquid crystal panel 12 to form an image on the inner surface of the front wind shield 20.

The front wind shield 20 sends the display light reflected by the reflecting mirror 40 to the eyes of the driver M. That is, the driver visually recognizes display information generated by the liquid crystal panel 12 as a displayed color virtual image 21.

Next, a circuit configuration for the liquid crystal panel 12 and the light source 10b is explained by referring to FIG. 2. An operation switch 80 is operated to operate the head up display. A light-quantity sensor 90 senses brightness outside the automobile as a quantity of light. A dimmer 100 sets the quantity of a controlled light emitted by the light source 10b in accordance with an operation carried out thereon.

Figure 3:
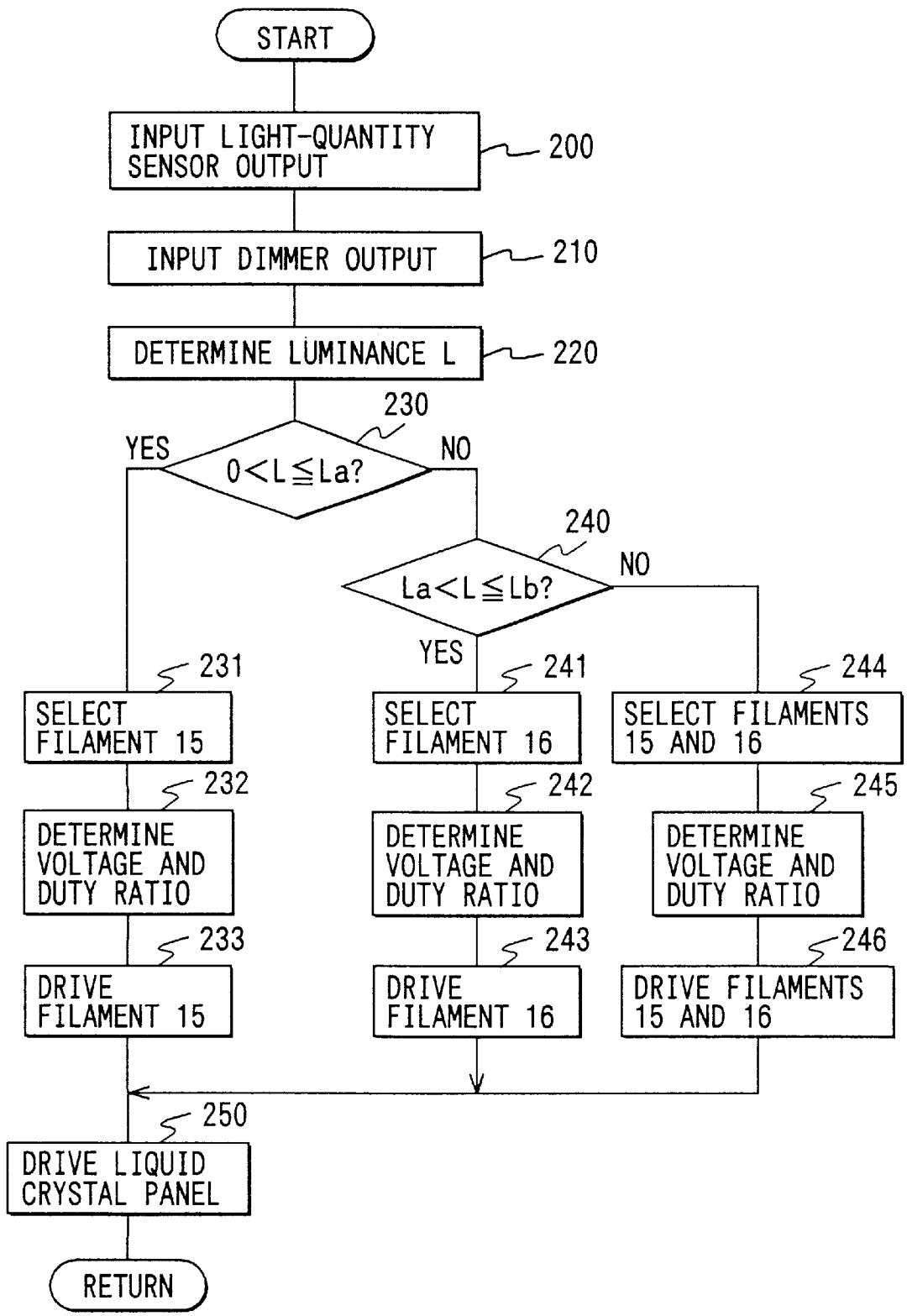
FIG. 3 is a flowchart representing the operation of a microcomputer employed in the head up display according to the present invention.

When power is supplied to a microcomputer 110 from a battery B mounted on the automobile by way of an ignition switch IG, the microcomputer 110 enters an operating state and executes a computer program represented by a flowchart shown in FIG. 3 in accordance with an operation carried out on the operation switch 80. During the execution of the computer program, the microcomputer 110 determines the luminance L of the light source 10b on the basis of signals output by the operation switch 80, the light-quantity sensor 90 and the dimmer 100. The microcomputer 110 also gives commands to the driving circuit 50 for driving the liquid crystal panel 12 and at least one of the driving circuits 60 and 70 for driving the filaments 15 and 16 respectively. It should be noted that the computer program is stored in a ROM of the microcomputer 110 in advance.

In the embodiment with a configuration described above, when power is supplied to the microcomputer 110 from the battery B by way of the ignition switch IG, the microcomputer 110 begins execution of the computer program based on an operation carried out on the operation switch 80 with a step 200 of the flowchart shown in FIG. 3. At step 200, a detection signal output by the light-quantity sensor 90 is supplied to the microcomputer 110. Then, at step 210, a light-control output of the dimmer 100 is supplied to the microcomputer 110.

Then, at step 220, the luminance L of the light source 10b is determined from the detection signal output by the light-quantity sensor 90 and the set control light quantity output by the dimmer 100. In detail, when the light-quantity sensor 90 outputs a detection signal representing a small quantity of light due to a dark environment, it is assumed that the dimmer 100 is set to output a small light control quantity. Given this presumption, the microcomputer 110 sets the luminance L at a small value so as not to produce excessive brightness having an adverse effect on the driving operation carried out by the driver.

When the light-quantity sensor 90 outputs a detection signal representing a very large quantity of light due to a bright environment, such as day time during nice weather, it is assumed that the dimmer 100 is set to output a large light control quantity. Given this presumption, the microcomputer 110 sets the luminance L at a very large value.

If the environment, provides brightness between day time with nice weather and night time, that is, intermediate brightness, it is assumed that the dimmer 100 is set to output a light control quantity in a range between the small and large values cited above. Given this presumption, the microcomputer 110 sets the luminance L in a range between the small and very large values described above.

Figure 4:
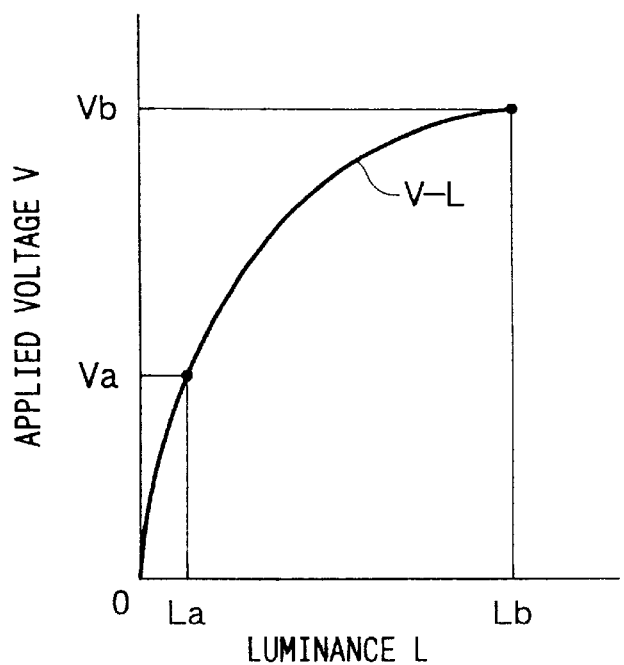
FIG. 4 is a graph representing a relation between a voltage applied to each filament and luminance of light emitted by each element according to the present invention.
Figure 5:
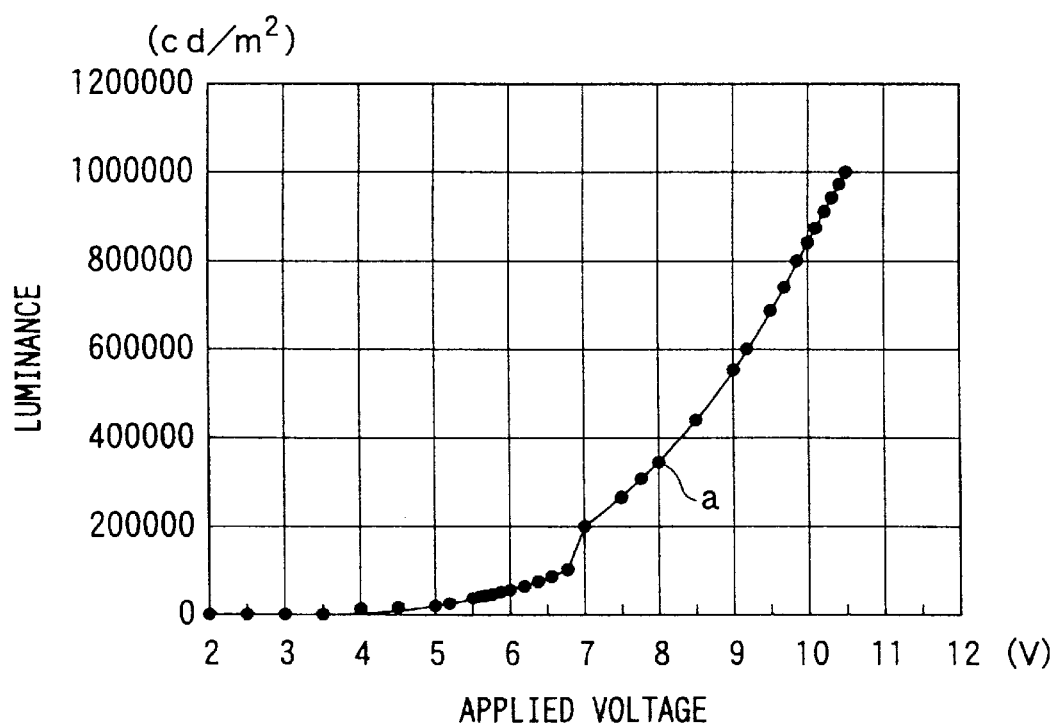
FIG. 5 is a graph representing a relation between a voltage applied to a conventional xenon lamp and light emitted by the lamp according to the present invention.
Figure 6:
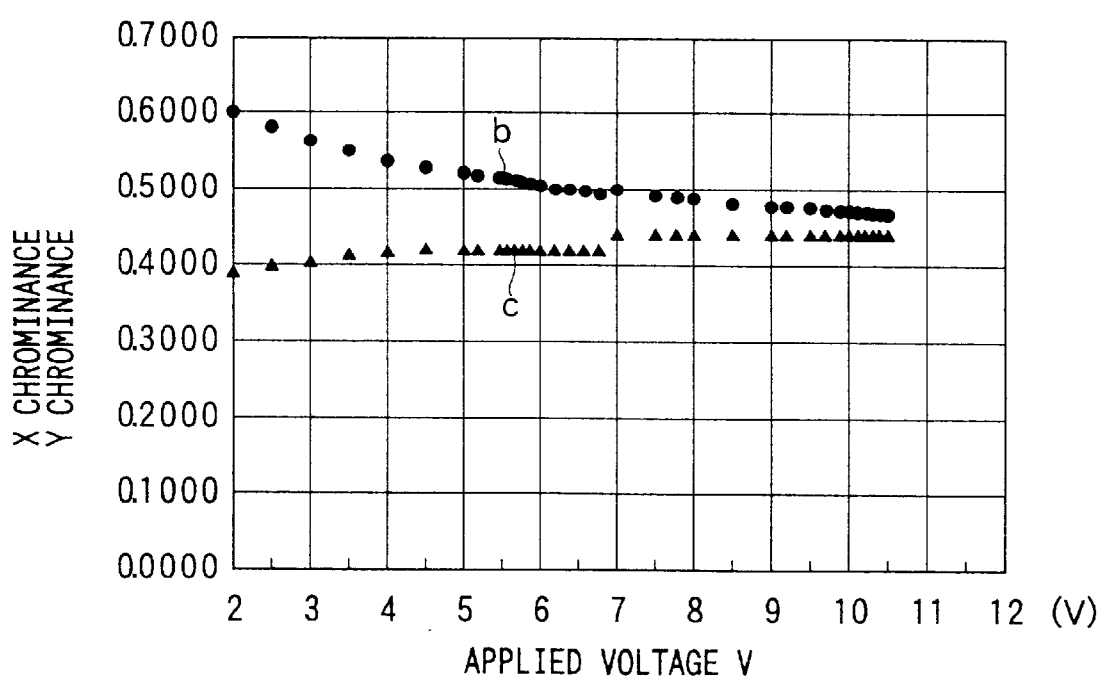
FIG. 6 is a diagram showing a relation between X chrominance and Y chrominance on a Munsell color table to an applied voltage for the conventional xenon lamp according to the present invention.

In order to assure luminance of the emitted light in the range cited above while suppressing the shift in color of light emitted by the light source 10b to a minimum, that is, while preventing the driver from observing a shift in color, this embodiment introduces a characteristic V-L representing a relation between a voltage applied to the light source 10b and luminance of the light emitted by the light source 10b as shown in FIG. 4. The voltage-luminance characteristic V-L is established as follows.

A relation between the applied voltage and the luminance of the filament 15 with a low level of luminance and a relation between the applied voltage and the luminance of the filament 16 with a high level of luminance are a characteristic represented by a single-hyperbolic curve. In the characteristic shown in FIG. 4, the filament 15 emits a light with luminance L in the range $0 < L \leq La$ whereas the filament 16 emits a light with luminance L in the range $La \leq L \leq Lb$. Maximum total luminance (La+Lb) can be produced jointly by the filaments 15 and 16. It should be noted that the limit La is luminance of an emitted light with a luminous flux of 10 lm and the limit Lb is luminance of an emitted light with a luminous flux of 100 lm. Since the maximum total luminance corresponds to 110 lm, the luminance ratio of light emitted by the light source 10b to the maximum luminance can be controlled over the range 1 to 1/110.

At step 230, it is determined whether the luminance L set at step 220 satisfies the relations $0 < L \leq La$ shown in FIG. 4.

During a night environment, the result of the determination is YES. In this case, the flow goes on to a step 231 at which the filament 15 with a low level of luminance is selected. Then, at step 232, a voltage V to be applied to the filament 15 is set at a level corresponding to the luminance L in the range 0<L≦La from the voltage-luminance characteristic V-L shown in FIG. 4. Also at this step 232, a duty ratio D is set at a value proportional to the set light control quantity of the dimmer 100.

At the next step 233, the microcomputer 110 carries out processing to drive the filament 15 based on the applied voltage V and the duty ratio D, which were set at step 232. Thus, the driving circuit 60 applies the applied voltage V set at step 232 to the filament 15 at the duty ratio D also set at step 232. As a result, the light source 10b emits a light with luminance L in the range 0<L≦La resulting from the application of the voltage V to the filament 15 at the duty ratio D.

If the environment is not a dark environment, the result of determination of step 230 is NO. In this case, the flow goes on to a step 240 to determine whether the luminance L satisfies the relations La<L≦Lb. If the environment provides intermediate brightness between day time with nice weather and night time, that is, if the result of the determination is YES indicating that the luminance L satisfies the relations La<L≦Lb, the flow goes on to a step 241 at which the filament 16 is selected. Then, at step 242, a voltage V applied to the filament 16 is set at a level corresponding to the luminance L in the range La<L≦Lb from the voltage-luminance characteristic V-L shown in FIG. 4. Also at this step 242, a duty ratio D is set at a value proportional to the set light control quantity of the dimmer 100.

At the next step 243, the microcomputer 110 carries out processing to drive the filament 16 based on the applied voltage V and the duty ratio D, which were set at step 242. Thus, the driving circuit 70 applies the applied voltage V set at step 242 to the filament 16 at the duty ratio D also set at step 242. As a result, the light source 10b emits a light with luminance L in the range La<L≦Lb resulting from the application of the voltage V to the filament 16 at the duty ratio D.

If the environment provides intermediate brightness between day time with nice weather and night time, the result of determination of step 240 is NO. In this case, the flow goes on to a step 244 at which both the filaments 15 and 16 are selected. Then, at step 245, a voltage V to be applied to the filament 15 is set at a level corresponding to the luminance La from the voltage-luminance characteristic V-L shown in FIG. 4. By the same token, a voltage V applied to the filament 16 is set at a level corresponding to the luminance Lb from the voltage-luminance characteristic V-L shown in FIG. 4. Also at step 245, a duty ratio D is set at a value proportional to the set light control quantity of the dimmer 100.

At the next step 246, the microcomputer 110 carries out processing to drive the filament 15 based on the applied voltage V and the duty ratio D, which were set at step 245, in order to generate the luminance La. In the same way, the microcomputer 110 carries out processing to drive the filament 16 based on the applied voltage V and the duty ratio D, which were also set at step 245, in order to generate the luminance Lb.

Thus, the driving circuit 60 applies the applied voltage V for the luminance La to the filament 15 at the duty ratio D set at step 245. Likewise, the driving circuit 70 applies the applied voltage V for the luminance Lb to the filament 16 at the duty ratio D set at step 245. As a result, the light source 10b emits a light with total luminance (La+Lb) resulting from the application of the voltage V for the luminance La to the filament 15 at the duty ratio D and the application of the voltage V for the luminance Lb to the filament 16 at the duty ratio D.

When the light source 10b is turned on as described above, the light source 10b emits a visible light to the liquid crystal panel 12 by way of the filter 13. After the processing is carried out at step 233, 243 or 246, processing to drive the liquid crystal panel 12 is performed at a step 250. Concretely, the driving circuit 50 is driven to display color information on the liquid crystal panel 12. As a result, the liquid crystal panel 12 receiving visible light from the light source 10b through the filter 13 emits information required by the automobile as a display light propagating to the reflecting mirror 40 by way of the opening 11b bored through the casing 11.

The reflecting mirror 40 reflects the display light coming from the liquid crystal panel 12, directing the reflected display light to the front wind shield 20 by way of the transparent dust-proof cover 32 as an image-formation light. As a result, the driver is capable of visually recognizing the display information generated by the liquid crystal panel 12 as a color virtual image 21 displayed in front of the front wind shield 20.

When the processing to drive the liquid crystal panel 12 is carried out at step 250 after the processing to drive the filament 15 is performed at step 233, the luminance of light emitted by the light source 10b, that is, the luminance of a light incident to the liquid crystal panel 12, has a value in the range 0<L≦La due to the selection of the filament 15. If the processing to drive the liquid crystal panel 12 is carried out at step 250 after the processing to drive the filament 16 is performed at step 243, the luminance of light emitted by the light source 10b, that is, the luminance of a light incident to the liquid crystal panel 12, will have a value in the range La<L≦Lb due to the selection of the filament 16. With the processing to drive the liquid crystal panel 12 carried out at step 250 after the processing to drive both the filaments 15 and 16 performed at step 246, the luminance of light emitted by the light source 10b, that is, the luminance of a light incident to the liquid crystal panel 12, has a value equal to the sum (La+Lb) due to the selection of both the filaments 15 and 16.

As described above, the light source 10b including the filaments 15 and 16 is employed as a back light of the liquid crystal panel 12 and the filaments 15 and/or 16 are selectively used in accordance with brightness outside the automobile to assure a low level of luminance, a maximum level of luminance or an intermediate level of luminance between the low level of luminance and the maximum level of luminance. It is thus possible to sufficiently widen a light-control range, that is, the range of the luminance of light emitted by the light source 10b, while suppressing changes in color of light emitted by a selected filament employed in the light source 10b to a minimum. In other words, the embodiment is capable of controlling the luminance ratio of light emitted by the light source 10b to the maximum luminance over the range 1 to 1/110 while suppressing changes in color of light emitted by a selected filament employed in the light source 10b to such a minimum that the driver is prevented from recognizing the changes in color.

Thus, the driver is capable of visually recognizing a displayed color virtual image 21 well at light-control luminance assured to match brightness produced by the external environment at day time with nice weather or at night, or intermediate brightness between the levels of brightness produced by the external environment at day time with nice weather and at night without being aware of changes in color. It should be noted that, as described above, by adjusting the luminance of light emitted by the light source 10b in accordance with the brightness outside the automobile, it is possible to assure the driver of a smooth driving operation and brightness allowing the virtual image 21 to be recognized visually during the day time with nice weather with a high degree of reliability without generating excessive brightness for a dark environment at night.

In addition, the filaments 15 and/or 16 are selectively used in accordance with brightness as described above. Thus, the life of the light source 10b can be lengthened substantially in comparison with a case in which both the filaments 15 and/or 16 are turned on without regard to brightness.

It is worth noting that the scope of the present invention is not limited to an embodiment wherein the light source 10b is implemented by a xenon or halogen lamp. That is, a light source of any type can be employed as long as both the filaments 15 and 16 are embedded therein.

In addition, the scope of the present invention is not limited to an embodiment wherein the light source 10b employs only two embedded filaments. That is, the light source 10b may employ three or more embedded filaments. In this case, the range of luminance is divided into segments each allocated to one of the elements.

Furthermore, the scope of the present invention is not limited to an embodiment implementing a head up display for an automobile. That is, the present invention can also be applied to a head up display for a variety of vehicles including buses and trucks.

Moreover, the scope of the invention is not limited to an embodiment wherein the liquid crystal panel 12 is a color liquid crystal panel. That is, the liquid crystal panel 12 can also be a black & white liquid crystal panel. Also in this case, the driver is capable of visually recognizing a displayed black & white virtual image 21 well without being aware of shifts in color of light emitted by the light source 10b by suppressing the shifts in color in the same way as the embodiment described earlier.

In addition, as an implementation of the head up display, an embodiment of the present invention may have a combiner.

Furthermore, the dimmer 100 may be eliminated from the embodiment of the present invention. In this case, at step 220, the luminance L of the emitted light is determined from a pre-adopted relation between a quantity of light detected by the light-quantity sensor 90 and a light-control quantity of the light source 10b. The light-control quantity is a light-control quantity set in accordance with brightness outside the automobile as explained in the description of the embodiment given earlier.

Moreover, the reflecting mirror 40 adopted in the embodiment may be an optical element such as a hologram concave mirror.

While the above-described embodiments refer to examples of usage of the present invention, it is understood that the present invention may be applied to other usage, modifications and variations of the same, and is not limited to the disclosure provided herein.

What is claimed is:

1. A head up display for a vehicle, comprising:
   a light source provided on a back-surface side of an instrument panel located below a front wind shield in the vehicle compartment of the vehicle, said light source emitting light along a path;
   a liquid crystal display unit provided on the back-surface side of the instrument panel along said path, said liquid crystal display unit filtering light from the light source to display light representing information;
   an optical element that directs light filtered by the liquid crystal display unit through an opening in the instrument panel to the front wind shield, light projected onto said front wind shield by said optical element forming an image on the wind shield; and
   the front wind shield reflecting light from the optical element to generate a virtual image for a vehicle occupant;
   the head up display further comprising:
      a brightness-sensing means that senses brightness outside the vehicle;
      a setting means that sets a light-control illumination of the light source to a value corresponding to the brightness outside the vehicle; and
      control means that controls luminance of light emitted by the light source according to the brightness outside the vehicle and the light-control illumination wherein:
         the light source has a plurality of embedded filaments, each of the embedded filaments having a luminance level different from a remainder of the plurality of embedded filaments;
         the control means controls the luminance of light emitted by the light source by driving a filament with a low luminance selected from the plurality of filaments when light emitted from said light source is set low;
         the control means controlling luminance of light emitted by the light source by driving at least a filament with a high luminance selected from the plurality of filaments when light emitted from said light source is set large;
         an applied voltage to said filament with low luminescence varies hyperbolically to a luminance of said filament with low luminance, an applied voltage to said filament with said high level of luminescence varies hyperbolically with said filament with said high level of luminance;
         a voltage change being larger per a luminescence change for said filament with a low level of luminance relative to a voltage change per a luminescence change for said filament with a high level of luminance; and
         the control means selecting one of two filaments based on said hyperbolic relationships, said control means determining an applied for the selected filament and driving the selected filament by applying the determined applied voltage.

2. A head up display for a vehicle according to claim 1, wherein said filament with low luminance has a tungsten wire having a size and width smaller than said filament with high luminance.

* * * * *